United States Patent [19]
Frykhult

[11] Patent Number: 5,316,675
[45] Date of Patent: May 31, 1994

[54] ROTATABLE ANNULAR HOLLOW DISC FOR FILTERING LIQUIDS

[75] Inventor: Rune Frykhult, Stockholm, Sweden

[73] Assignee: Ingeniorsfirman R. Frykhult AB, Stockholm, Sweden

[21] Appl. No.: 861,983

[22] PCT Filed: Feb. 18, 1991

[86] PCT No.: PCT/SE91/00113
§ 371 Date: Jun. 30, 1992
§ 102(e) Date: Jun. 30, 1992

[87] PCT Pub. No.: WO91/12066
PCT Pub. Date: Aug. 22, 1991

[30] Foreign Application Priority Data
Feb. 16, 1990 [SE] Sweden .................. 9000571

[51] Int. Cl.⁵ ............................................. B01D 33/23
[52] U.S. Cl. ................................... 210/327; 210/345; 210/346; 210/347; 210/404; 210/331
[58] Field of Search ............... 210/327, 331, 345, 346, 210/347, 359, 402, 403, 404, 486

[56] References Cited

U.S. PATENT DOCUMENTS

| | | | |
|---|---|---|---|
| 4,077,887 | 3/1978 | Languik | 210/347 |
| 4,123,363 | 10/1978 | Koskinen | 210/331 |
| 4,255,264 | 3/1981 | Madsen | 210/404 |
| 4,330,405 | 5/1982 | Davis et al. | 210/331 |
| 4,728,424 | 3/1988 | Miura | 210/331 |

FOREIGN PATENT DOCUMENTS 433571 6/1984 Sweden .
2178973 2/1987 United Kingdom .

Primary Examiner—Matthew O. Savage
Attorney, Agent, or Firm—Mason, Fenwick & Lawrence

[57] ABSTRACT

A disc filtering apparatus for filtering liquids, such as fiber pulps suspensions, includes hollow filter discs, each of which has two opposed side walls of filter material. A plurality of circumferentially spaced support arms extend within each hollow filter disc, for supporting the side walls of filter material. Between the support arms, each side wall of filter material is supported by at least one wire member extending substantially along the filter disc and attached to the support arms.

3 Claims, 5 Drawing Sheets

ROTATABLE ANNULAR HOLLOW DISC FOR FILTERING LIQUIDS

BACKGROUND OF THE INVENTION

1. Field of the Invention

The present invention relates to an apparatus for filtering liquids, such as fibre pulp suspensions in the paper making industry.

2. Description of the Prior Art

A common type of filtering apparatuses for filtering liquids comprises at least one rotatable annular hollow filter disc with two opposed side walls of filter material adapted to be at least partly immersed in a body of the liquid to be filtered. Within the hollow filter disc, there is a plurality of circumferentially spaced support arms, for supporting the side walls of filter material.

This type of filtering apparatus is relatively expensive, and, therefore, in practice, it has been used to a limited extent in the paper making industry for the purpose of concentrating fibre suspensions up to about 3% fibre content. For that purpose, it has been common practice to use a rotary filtering apparatus of the so-called drum type, which has a horizontal cylindrical drum, the circumferential wall of which is covered with filter material. Such a drum filtering apparatus is simple and inexpensive. However, a drum filtering apparatus is much more space demanding in installation, as compared with a disc filtering apparatus of a corresponding capacity.

Conventionally, a filter disc is an assemblage of a great number of separate complicated constructed sector elements. Each sector element includes two opposed perforated plate walls for supporting the side walls of filter material, such as cloth. These perforated plates substantially decreases the operative filtering area of the filter material, since there must be sufficient broad wall portions between the holes in the plates, in order to make the plates strong. Such a decreased operative filtering area is a serious deficiency in connection with filtration of the kind of fibre suspensions which suffers from poor dewatering properties (Low-freeness suspensions).

Attempts to replace such perforated plates by prefabricated steel net, in order to increase the operative area of the filter material, have proved unsuitable for reasons of quality and costs. A drawback to the use of steel nets is that each end of the wires of such a net has to be welded to the filter disc. Also, to cover the entire side of a filter disc with steel net, several pieces of steel net must be jointed to each other by welding abutting ends of wires onto reinforcing steel strips located at the inner side of the steel net. In addition, each welded end of wire or joints of wires must be covered with some kind of protective means, to ensure that the filter material will not be damaged by the welded ends of wires. Application of reinforcing steel strips and protective means on the filter disc would mean, that the operative area of the filter material would be decreased. The resulted great number of welded wire ends would increase the risk of arising defective welded ends of wire, which in turn would result in stoppage. Besides, by experience it is known that the use of net structures for supporting a filter cloth results in an increased wear and tear of the filter cloth.

SUMMARY OF THE INVENTION

The object of the present invention is to provide a simple and inexpensive disc filtering apparatus, in which the filter material has a large operative area.

This object is fulfilled by means of an apparatus for filtering liquids, such as filter pulp suspensions, comprising:

at least one rotatable annular hollow filter disc with two opposed side walls of filter material adapted to be at least partly immersed in a body of a liquid to be filtered, a plurality of circumferentially spaced support arms extending within the hollow filter disc, for supporting the side walls of filter material, and at least one wire member extending substantially circumferentially along each side wall of filter material of the filter disc and attached to the support arms, for supporting the side wall of filter material between the support arms.

The wire member is preferably wound in a spiral around the centre of the filter disc on each side of the filter disc. This makes the filter disc extremely simple to fabricate and, consequently cheap in price.

As an alternative, each side of the filter disc may be provided with a plurality of wire members, each of which extends in a loop, said loops of wire members being radially spaced from each other. The loops of wire members may be positioned concentric with the filter disc.

DETAILED DESCRIPTION OF THE INVENTION

Figure 1:
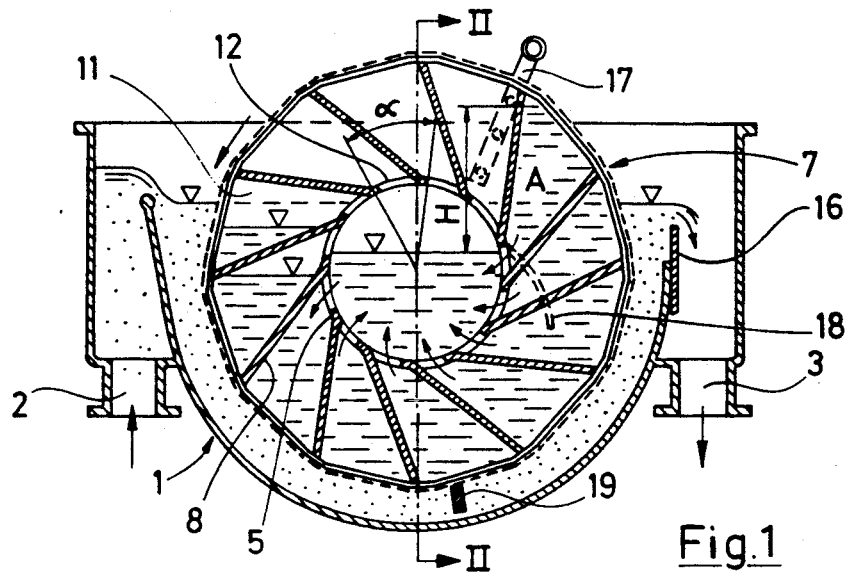
FIG. 1 is a vertical cross-section of a first embodiment of the filtering apparatus of the invention.
Figure 2:
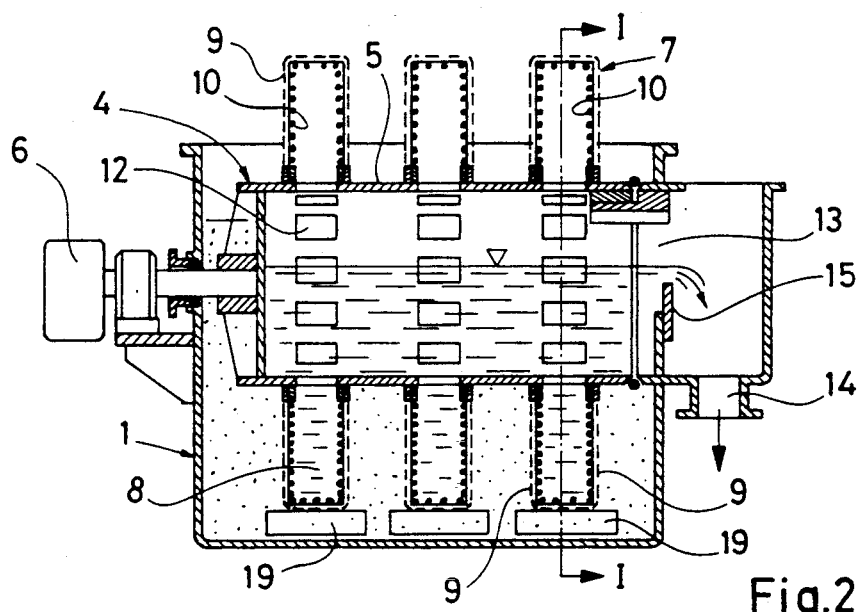
FIG. 2 is a longitudinal cross-section taken along line II—II of FIG. 1.

The filtering apparatus shown in FIGS. 1 and 2 comprises a container 1 with an inlet 2 for the liquid to be filtered at one side of the container 1, and an outlet 3 for a created course fraction of the liquid, at the opposite side of the container 1. A circular cylindrical drum shaft 4 with a circumferential wall 5 extends horizontally in the container 1 and is journalled on the latter. The internal diameter of the hollow shaft 4 is 1.6 meters (normally 1-2 m). A drive motor 6 at one end of the shaft 4 is arranged to rotate the shaft 4.

Three hollow annular filter discs 7, each having a diameter of 4 meters (normally 3-5.5 m.), are vertically mounted on the shaft 4. The discs 7 are spaced from each other and situated concentric with the shaft 4. Each filter disc 7 comprises twelve stiff arms 8, and two opposed side walls 9 of filter material, such as cloth or felt, supported by wire members 10, which are spirally wound through grooves 10A formed in the arms 8 at each side of the filter disc 7. The arms 8 extend from the hollow shaft 4 forwards in the direction of rotation of the filter discs 7 dividing the interior of each filter disc 7 into twelve chambers 11 located in series around the filter disc 7. The chambers 11 communicate with the interior of the hollow shaft 4 via holes 12, respectively, in the circumferential wall 5. As seen in the direction of rotation of the filter discs 7, the sector angle $\alpha$ between the radially outer end of the leading arm 8 of each chamber 11 and the leading part of the hole 12 of the chamber 11 should be chosen in the interval of 25 to 75 degrees.

Opposite the drive motor 6, the hollow shaft 4 has an open end, at which the circumferential wall 5 is sealingly journalled on the container 1 around a hole 13 in the latter. The interior of the hollow shaft 4 communicates via said open end of the shaft 4 and the hole 13 with the interior of a fine fraction outlet 14 arranged at the outside of the container 1. There is an adjustable overflow member 15 on the container 1 at the hole 13 for providing a pool of fine fraction in the hollow shaft 4.

An adjustable overflow member 16 for controlling the volume of the liquid in the container 1 is arranged on the walls of the container 1 at the outlet 3 for thickened suspension.

Spray nozzle means 17 is arranged at each side of each filter disc 7 for spraying high pressure jets of liquid against a mat on the disc 7 formed by course particles during operation, so that the mat is loosened from the filter material and drop to the liquid in the container 1. There is an entrainment member 18 on each side of each filter disc 7 extending from the hollowing shaft 4 backward in the direction of rotation of the filter discs 7 for entraining the course fraction in the container 1 radially outward and circumferentially forward to the overflow member 16. Each filter disc 7 is also provided with an entrainment member 19 on the radially outer periphery of the disc 7 for entraining the course fraction from the vicinity of the wall of the container 1 to the overflow member 16.

Figure 3:
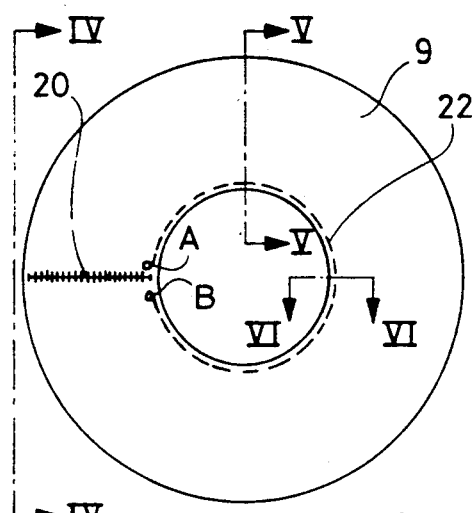
FIG. 3 is a filter cloth for a filter disc in the apparatus of FIGS. 1 and 2.
Figure 4:
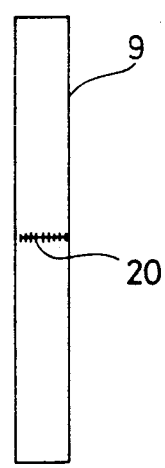
FIG. 4 is a view along line IV—IV of FIG. 3.
Figure 5:
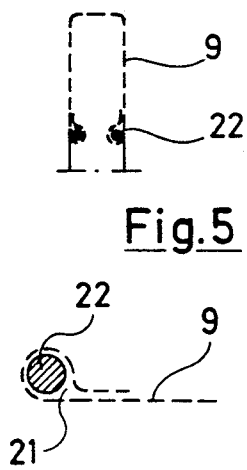
FIG. 5 is a section taken along line V—V of FIG. 3.
Figure 6:
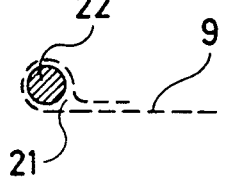
FIG. 6 is an enlarged section taken along line VI—VI of FIG. 3.
Figure 7:
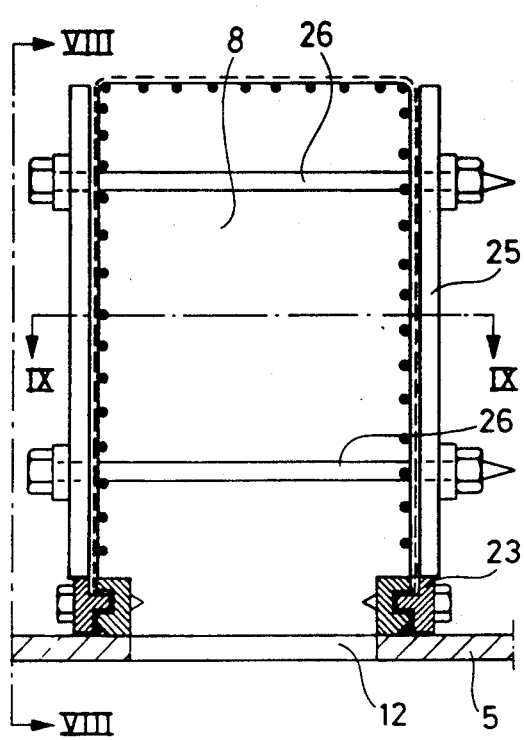
FIG. 7 is an enlarged section through a filter disc for the apparatus of FIGS. 1 and 2, showing one half of the filter disc.
Figure 10:
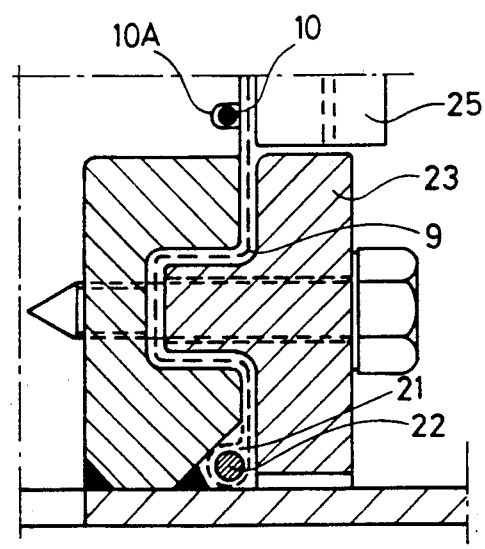
Figure 11:
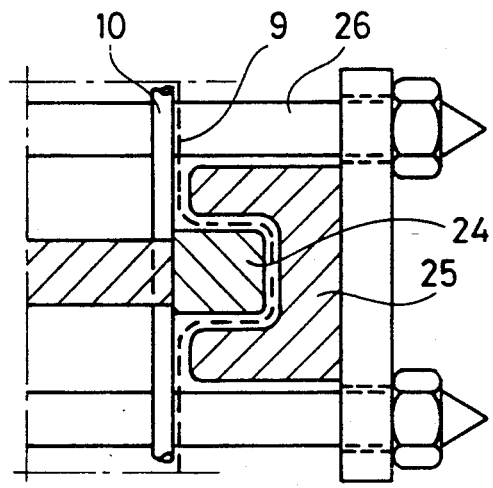

Each filter cloth 9 is bag-shaped with a centre hole and provided with at least one radial joint 20 to enable the cloth 9 to be applied on the shaft 4 and one of the filter discs 7 (FIGS. 3 and 4). The radially innermost portion of the cloth 9 forms an annular channel 21, in which an elastic elongated member 22 extends, for example a rubber strap or a spiral spring (FIG. 6). The two ends of the elastic member 22 are fastened to the cloth 9 at the points A and B shown in FIG. 3. In an unstretched state, the elastic member 22 is shorter than the channel 21, with the result that the cloth 9 is radially stretched, as the joint 20 is closed (for instance by means of a zipper) and the elastic member 22 is stretched to the same length as that of the channel 21. The cloth 9 is further radially stretched by means of annular clamping members 23 (FIG. 10).

In the circumferential direction of the filter disc 7, the cloth 9 is stretched by means of a number of stretching devices comprising radial rods 24, which have been welded to the arms 8 after that the wire members 10 have been wound on the arms 8, and radial beams 25 having U-shaped cross-section, which beams 25 interlock with the radial rods 24 (FIGS. 7 to 9 and 11). The cloth 9 is situated between the rods 24 and the beams 25. Between axially opposed pair of beams 25 there are extending clamping rods 26, for clamping said pair of beams 25, so that the cloth 9 is circumferentially stretched and prevented from gliding in the circumferential direction.

Figure 12:
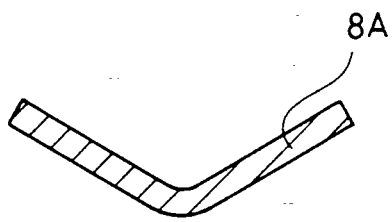
Figure 15:
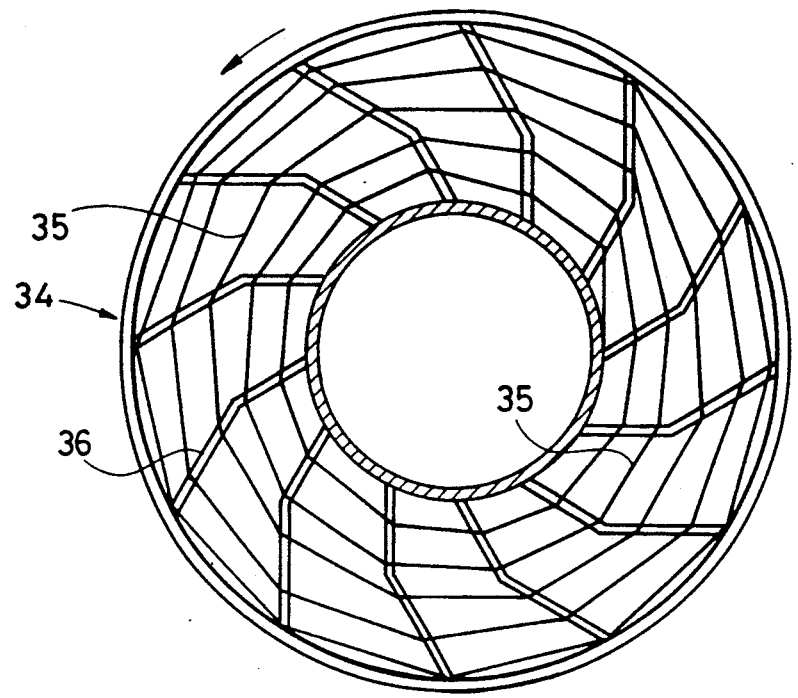
Figure 16:
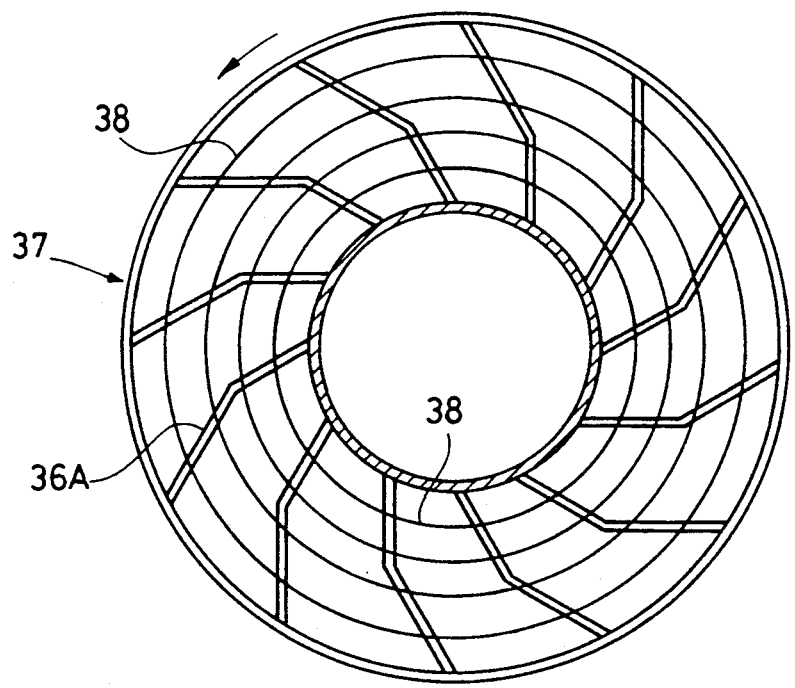

The arms 8 have rectangular cross-section. However, as an alternative, they may have any desired cross-section, for example a V-shaped cross-section as the arm 8A shown in FIG. 12. A filter disc equipped with arms 8A having such a V-shaped cross-section has an increased strength in the circumferential direction of the filter disc, as compared with a filter disc equipped with arms having rectangular cross-section. The arms 8 and 8A may also be bent in their longitudinal extensions, as shown in FIGS. 15 and 16.

Figure 13:
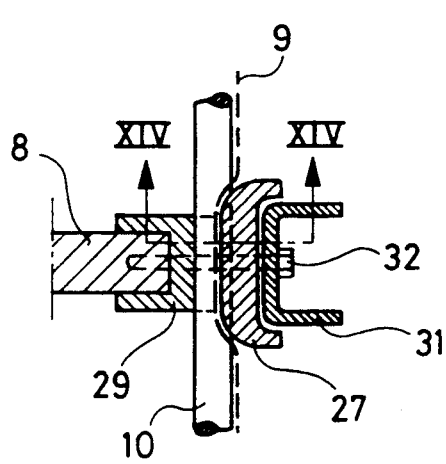
Figure 14:
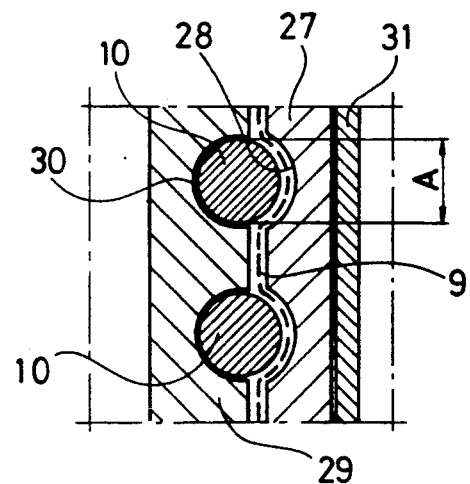
FIG. 14 is a part of a section taken along line XIV—XIV of FIG. 13, FIGS. 15 and 16 are schematic views of two alternative filter discs for the apparatus of FIGS. 1 and 2.

In case a high course particle concentration in the created course fraction is desired, communication in circumferential direction between the chambers 11 should be prevented. To achieve this, there are provided sealing members 27 with grooves 28 for receiving the wire members 10. The sealing members 27 are adapted to clamp the cloth 9 against all of the arms 8 either directly or via separate releasable spacing members 29 provided with grooves 30, for receiving the wire members 10 (FIGS. 13 and 14). By the use of said separate spacing members 29, the advantage is achieved that expensive milling of the grooves 10A in the arms 8 (which must be made of steel) is avoided. The spacing member 29 and the sealing members 27 can be produced in plastic material by inexpensive molding operations. The sealing members 27 are clamped against the cloth 9 by means of clamping bars 31 and bolts 32, as illustrated in FIG. 13. The extension A of the opening of each groove 30, as illustrated in FIG. 14, is somewhat smaller than the diameter of the wire members 10, so that the wire members 10 are clamped by the spacing members 29, as the wire members 10 are applied in the grooves 30.

Figure 8:
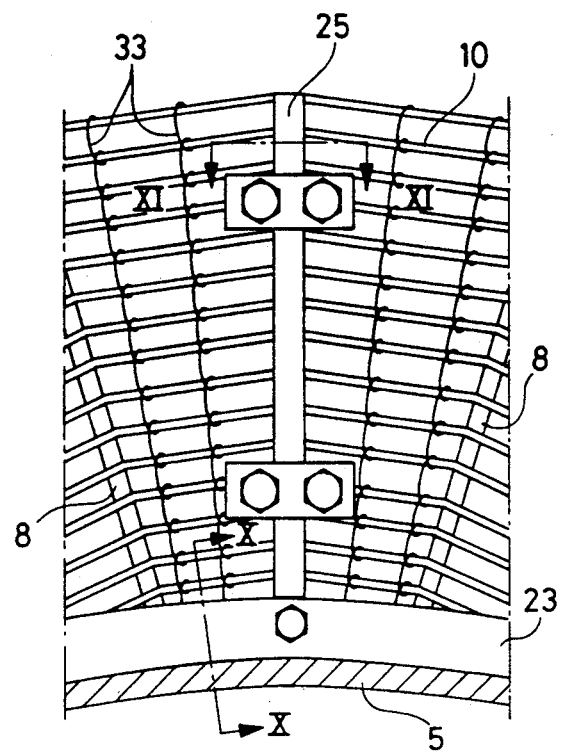
FIGS. 8 and 9 are views along lines VIII—VIII and IX—IX, respectively, of FIG. 7, FIGS. 10 and 11 are views along lines X—X and XI—XI, respectively, of FIG. 8, FIGS. 12 and 13 are details of a filter disc for the apparatus of FIGS. 1 and 2.
Figure 9:
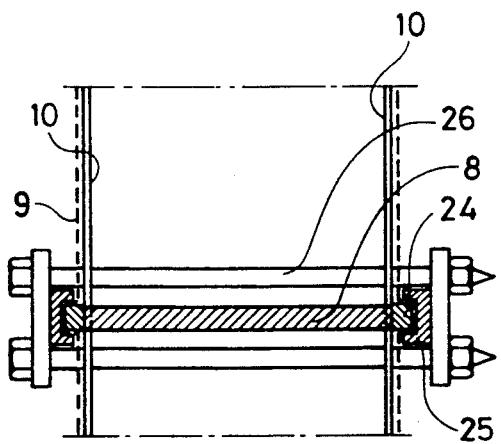

In filter discs provided with only a few arms 8 resulting in a large circumferential distance between adjacent arms 8, it may be suitable to arrange some kind of radial spacing means between the wire members 10 to ensure that the radial distance between the wire members 10 is maintained, for example at stoppage because of fibre clogging in the container 1. An example of such a spacing means is shown in FIG. 8. The spacing means according to FIG. 8 comprises two fine threads 33 radially arranged between each pair of adjacent arms 8. The threads 33 are attached to the shaft 4, and each thread 33 extends in a loop around each wire member 10 which is crossed by the thread 33.

An important field of use of the apparatus of the invention is for dewatering fibre pulp suspensions and, therefore, the operation of the apparatus shown in FIGS. 1 and 2 will be described in the following in connection with dewatering of a fibre pulp suspension.

A fibre pulp suspension to be dewatered having a fibre concentration of typically 0.6% is supplied to the container 1 through the inlet 2. The surface level of the suspension in the container 1 is adjusted by means of the overflow member 16, so that the side walls 9 of filter material, which cover the chambers 11 being on top of the filter discs 7, are above the suspension. The shaft 4 is rotated by the drive motor 6 in a direction, such that the parts of the filter discs 7 which are located next to the inlet 2 are displaced downward, while the parts of the filter discs 7 which are located next to the overflow member 16 at the outlet 3 are displaced upward. The hydrostatic pressure in the suspension in the container 1 causes a fine fraction of the suspension, mainly containing water, to pass through the side walls 9 of filter material into the chambers 11. The fine fraction so created flows from the chambers 11 via the holes 12 of the circumferential wall 5 into the hollow shaft 4. A pool of fine fraction is maintained in the hollow shaft 4 by means of the overflow member 15, over which fine fraction passes and then is discharged via the fine fraction outlet 14. The overflow member 15 is adjusted such that a hydrostatic pressure difference large enough is maintained between the suspension in the container 1 and the pool of fine fraction in the hollow shaft 4.

In the suspension in the container 1, a porous mat of fibres is created on the side walls 9 of filter material. The mat becomes thicker and more liquid impervious during the movement of the side walls 9 through the suspension. As a chamber 11 is in the two o'clock position noted by the reference numeral A in FIG. 1, this chamber 11 has raised its content of fine fraction substantially up above the suspension in the container, so that a negative pressure corresponding to the head H of the operating fine fraction in the chamber 11 is created in the chamber 11. The hole 12 of this chamber 11 constituting an outlet for the fine fraction opens into the pool of fine fraction, thereby preventing air from entering the chamber 11 from the hollow shaft 4. Said negative pressure created in the chamber 11 sucks fine fraction out of the mat of fibres into the chamber 11 and air into the mat. The mat of fibres is disintegrated into loose clumps of fibres by water jets from the spray nozzle means 17, and said clumps of fibres drop from the side walls 9 into the suspension in the container 1. The thickened suspension containing said clumps of fibres is entrained by means of the entrainment members 18, 19 over the overflow member 16 to the outlet 3. (The entrainment members 18 are provided with recesses to be able to pass the spray nozzle means 17.) The thickened fibre pulp suspension leaving the apparatus through the outlet 3 constitutes the created course fraction of the suspension, which in this case may have a fibre concentration of up to about 5%, possibly more.

The modified filter disc 34 shown in FIG. 15 has spirally wound wire members 35 and twelve arms 36. The filter disc 34 is identical to the filter disc 7 (FIGS. 1 and 2), except that the arms 36 are bent forward in the direction of rotation of the filter disc 34.

The modified filter disc 37 shown in FIG. 16 has wire members 38 and twelve arms 36A. The filter disc 37 is identical to the filter disc 34 (FIG. 15), except that the wire members 38 form concentric rings on the filter disc 37.

Alternatively, the arms of each filter disc may be designed, so that each arm only supports one side wall of the filter disc, whereby created filtrate can flow freely in the circumferential direction of the filter disc. In such a case, the arms may be arranged in pairs, each pair of arms forming a V, as seen in an axial section through the filter disc, with the apex of said V located at the radially outermost end of the filter disc. As the created filtrate in the discs is able to flow in the circumferential direction of the discs, the discs can have a faster rotational speed, which increases the capacity. Of course, a drawback in such a case is that the course particle concentration in the created course fraction is decreased.

Figure 17:
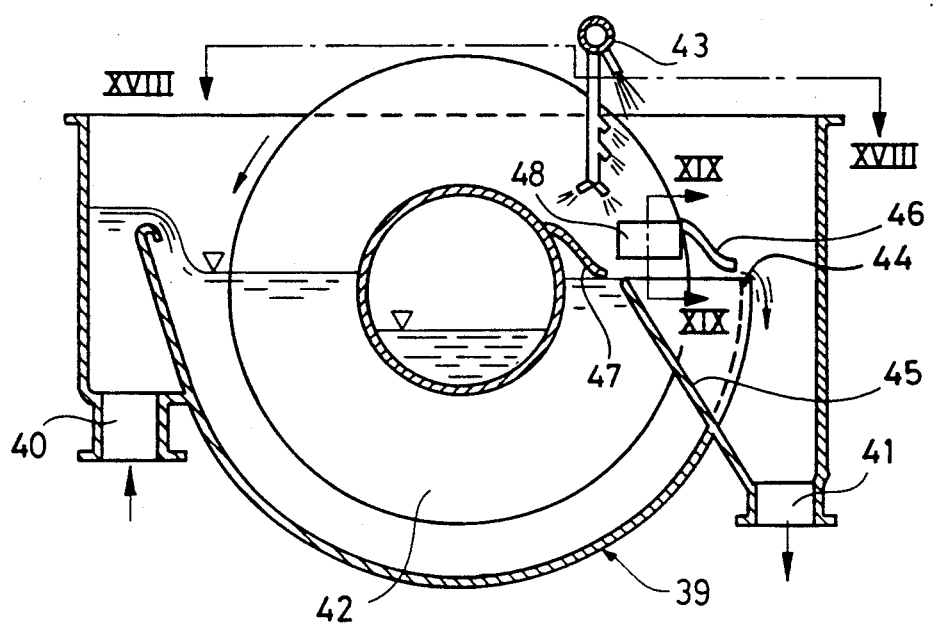
FIG. 17 is a cross-section of a second embodiment of the filtering apparatus of the invention.
Figure 18:
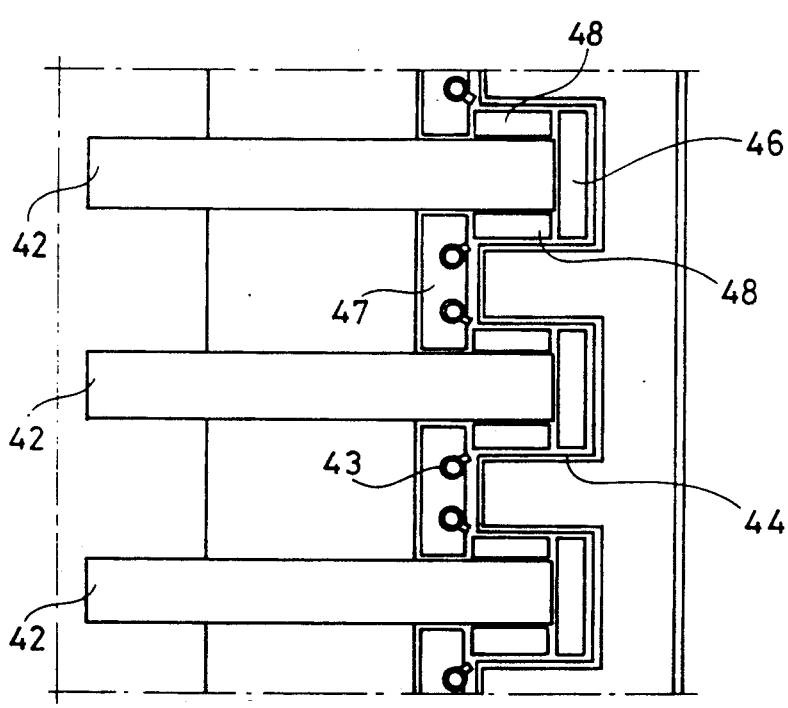
FIGS. 18 and 19 are sectional part views along lines XVIII—XVIII and XIX—XIX, respectively, of FIG. 17.
Figure 19:
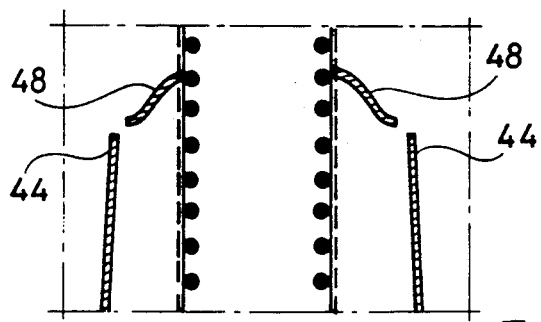

The embodiment of the filtering apparatus of the invention shown in FIGS. 17 to 19 comprises a container 39, an inlet 40, an outlet 41, filter discs 42, and spray nozzle means 43, all located in like manner to the analogous components described in connection with FIGS. 1 and 2. The difference between the apparatus of FIGS. 17 to 19 and the apparatus of FIGS. 1 and 2 lies in the manner in which the created course fraction is discharged.

The wall of the container 39 forms an overflow member 44 at the outlet 41. The overflow member 44 extends inward along each side of the filter disc 42, such that chute members 45 are formed, which are inclined toward the outlet 41.

Each side of each filter disc 42 is provided with an outlet entrainment member 46 extending outward from the raidally outer end of the filter disc 42 and backward in the direction of rotation, and an inner entrainment member 47 extending outward from the radially inner end of the filter disc 42 and backward in the direction of rotation. The entrainment members 46 and 47 are positioned, such that they just go clear of the overflow member 44, as they pass the latter during rotation of the filter disc 42. Radially between the outer and inner entrainment members 46 and 47 on each side of each filter disc 42, there is an intermediate entrainment member 48. The axial extension of each intermediate member 48 is restricted, such that the intermediate entrainment members 48 just go clear of the overflow member 44, as they pass the latter during rotation of the filter disc 42.

In operation, thickened suspension is entrained by the entrainment members 46, 47 and 48 up to the overflow member 44, where the course fraction is dropped into the chute members 45 with the aid of jets of fluid from the spray nozzle means 43.

I claim:
1. An apparatus for filtering liquid, such as fiber pulp suspensions, comprising:
   at least one rotatable annular hollow filter disc with two opposed side walls of filter material adapted to be at least partly immersed in a body of a liquid to be filtered;
   a plurality of circumferentially spaced support arms extending within the hollow filter disc, the side walls of filter material being supported by the support arms; and
   at least one support member extending substantially circumferentially along each side wall of filter material of the filter disc, each support member being attached to the support arms and comprising a single piece of wire extending around the center of the filter disc, the side wall of filter material being supported between the support arms by the wire support member, wherein the wire support member on each side of the filter disc extends in a spiral around the center of the filter disc.

2. An apparatus according to claim 1, wherein the support arms have grooves formed therein, and wherein each wire support member is inserted in the grooves formed in the support arms.

3. An apparatus according to claim 1, further comprising a plurality of separate spacing members releasably secured to each of the support arms, and wherein each wire support member is attached to a separate spacing member on each support arm.

* * * * *